Patented May 19, 1925.

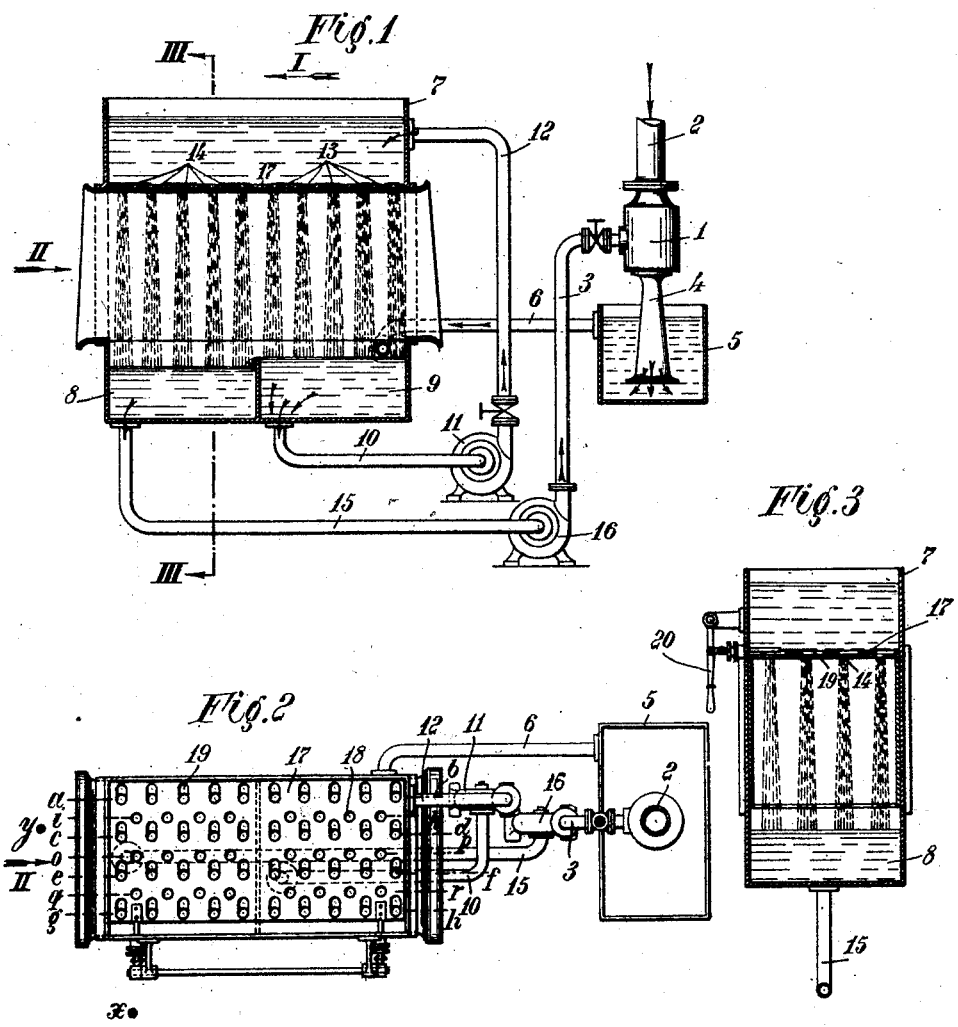

1,538,457

UNITED STATES PATENT OFFICE.

HEINRICH ZOELLY, OF ZURICH, SWITZERLAND.

WATER-COOLING DEVICE FOR CONDENSERS.

Application filed March 14, 1921. Serial No. 452,170.

*To all whom it may concern:*

Be it known that I, HEINRICH ZOELLY, a citizen of the Republic of Switzerland, residing at Zurich, Hardturmstrasse 19, Switzerland, have invented certain new and useful Improvements in Water-Cooling Devices for Condensers (for which applications for patents have been filed in Switzerland, January 4, 1918, Patent No. 79,006, and in Germany, January 9, 1918, application No. K. 65,336); and I do hereby declare the following to be a clear, full, and exact description of the invention, such as will enable others skilled in the art to which it appertains to make and use the same, reference being had to the accompanying drawing, and to letters or figures of reference marked thereon, which form a part of this specification.

This invention relates to a method and a contrivance for re-cooling the cooling water of steam-condensing plants on vehicles by means of an air current conducted transversally to the jets into which the water to be cooled is divided. According to this method, the quantity of water and its distribution are chosen in such a manner as to prevent the speed of the air in relation to the re-cooling contrivance (the so called relative speed) from exceeding 5 metres per second within said contrivance. The method and the contrivance can be devised in such a way that the water to be cooled is made to fall freely from an upper reservoir into a lower reservoir, without it (the water) or the air being in any way hindered by any obstructions mounted in the path of the air current, thus allowing an unimpeded passage for water or air, and that solely the quantity and distribution of the free falling water have to be regulated in order to maintain the admissible relative air speed. Further, the method can be so devised and the contrivance so designed that the quantity and the distribution of the water are made dependent on the speed of the vehicle. During full load, the water to be cooled can be conveyed across the air current so as to enable the water to fall from an upper reservoir into a lower reservoir which is divided, transversally to the direction of the current of air, into two compartments, the water collected in one of the compartments of the lower reservoir being re-conveyed to the upper reservoir, in order that it may pass again through the air current, whilst the water collected in the other compartment of the lower reservoir is conveyed to the condensing plant.

As an exemplification of the invention, the annexed drawing shows, diagrammatically, a contrivance for carrying the method into effect. In this drawing:

Fig. 1 represents a vertical longitudinal section and

Fig. 2 a part of the plan view of such a contrivance for mounting on a steam locomotive.

Fig. 3 is a section on line III—III of Fig. 1.

It is assumed, for instance, that the locomotive moves in the direction of the arrow I from right to left producing in the contrivance a current of air directed from left to right (direction of arrow II).

Referring to Figure 1, 1 is a jet condenser; the steam which is to be condensed being admitted to the condenser through the inlet 2 and the working water, which is under pressure, through pipe 3. Said water has to condense the steam and draw the air from the steam engine or turbine which drives the locomotive. Steam and air are fed through pipe 2 to the condenser. The mixture of air and water passes from the diffuser 4 into the reservoir 5 and flows through pipe 6 into the re-cooling contrivance. This consists chiefly of an upper reservoir 7 and a lower reservoir which is subdivided into a front compartment 8 and a back compartment 9, as well as of the piping and pumps appertaining thereto. The water is drawn from the back compartment 9 of the lower reservoir by means of pipe 10 and pump 11, and conveyed through pipe 12 to the upper reservoir 7, in the bottom of which holes 13 and 14 are provided. The water discharged through the holes 13 is collected in the back part 9 of the lower reservoir, and the water discharged through the holes 14 is collected in the front part 8 of said reservoir. Thus, part of the water collected in the upper reservoir 7 falls back into compartment 9 of the lower reservoir and is forced to move in a cycle by pump 11. It is thus adapted to come several times in contact with the air current streaming horizontally from left to right in the direction of the arrow II. The jets of water discharged through the holes 14 from the upper reservoir 7 come immediately into contact with the air when the latter enters into the contrivance (i. e. at C), that is to say, just where the air has the lowest temperature and the greatest cooling capacity. The water which is collected in the front part 8 of the lower reservoir has therefore the lowest temperature. Owing to this, the working water needed for the jet condenser 1, is drawn off by means of pipe 15 and pump 16 from said front part 8 of the reservoir. The excess of water can flow over in either direction from the part 8 into the part 9 of the lower reservoir, or vice versa. According to Fig. 1, water is for the time being, flowing over from the back part 9 of the lower reservoir to the front part 8 of said reservoir.

The air passing from the left to the right transversally to the jets of water which fall down into the lower reservoir tends to deviate said jets towards the right owing to friction and to the pressure caused by the air impinging upon said jets. This involves the danger that part of the water falling downwards, is blown beyond the lower reservoir and consequently lost for further cooling. This could be avoided, to a certain extent at least, by extending the lower reservoir to the right which, however, would entail the use of a contrivance of such a length that would render its employment on a locomotive impossible. And even in spite of such an arrangement, a large quantity of the water would be blown far to the back, if the speed of the air relative to the cooling contrivance, and thus to the jets of water, were too high. To avoid this, the quantity of the water and its distribution are chosen in such a way that the relative speed of the air does not exceed 5 metres per second within the re-cooling contrivance. This can be particularly explained with reference to Fig. 2 which represents the apparatus as seen from above. When the vehicle (locomotive) provided with this cooling contrivance, has for instance a speed from right to left of 72 kilometres per hour, a particle of air has, for instance at the point x, (that is to say, at the point so far removed from the vehicle as not to be influenced by the movement of the latter) an absolute speed of zero and in relation to the contrivance a relative speed of 20 metres per second. This particle of air maintains this ratio of speed. Not taking into consideration the influence of occurring shocks and friction, the contrivance would also move to the left at a speed of 20 metres per second in relation to a particle of air which is for the moment at y, i.e., right in front of the contrivance, while this particle of air would for the time being remain immovable. In reality, however, this particle of air at y will oppose a certain resistance to the motion of the water jets, directed during the travelling of the vehicle, from right to left, due to the friction and impacts produced. Owing to this the particle of air attains also an absolute speed from right to left, as soon as it enters the bundle of jets. The greater this absolute speed becomes, the more the relative speed of the particle of air with regard to the water jets diminishes, and the smaller is its deviating action upon the jets of water suituated further back. Now, it is possible to choose in the present example the quantity or number and the distribution of the jets of water in such a manner that the speed of the air within the contrivance increases to an absolute speed, directed from right to left, of at least 15 metres per second, whereby the relative speed falls to 5 metres per second and even to less. At such a relative speed the air is not able to deviate the jets of water, which fall at the back of the contrivance, to the right to any great extent.

One must oppose a greater resistance to the relative passage of the air across the cooling contrivance when the vehicle runs fast than when it runs slowly. This can be effected for instance by keeping open, when the vehicle is travelling at a low speed, only the holes of the upper reservoir which, as shown in Fig. 2 are in the vertical planes a—b, c—d, e—f and g—h respectively, and by keeping the intermediate holes closed, leaving thereby a relatively large section free for the passage of air. For high speeds of the vehicle, the holes in the planes i—k, o—p, and q—r, are opened also, so that the respective jets form the requisite obstruction to the current of air. This way of regulation which may be effected by means of a member 17 containing holes 18 and slots 19 adapted to close temporarily part of the holes 13 and 14, on being displaced by an actuating lever 20 fulfils at the same time the condition that more cooling water is made to pass through the contrivance when the locomotive runs at high speed than low speed, said condition having to be fulfilled because in the first case a larger volume of steam has to be condensed and therefore the total cooling action must be greater. Of course, this can also be attained by regulating the output of the pumps. At a greater travelling speed the pump 11 is adjusted for a larger output, firstly in order to bring the same cooling water more often into contact with the air current, and secondly to oppose a greater resistance to the air current, thereby keeping its relative speed within the device below the desired limit of 5 metres per second.

Instead of causing the water to fall freely from above, as is shown in the exemplification of the invention, it could also be projected horizontally across the air current by means of a pump. Should the air current produced by the travelling vehicle not suffice, also a fan may be used. As it is practiced in contrivances already known, special obstructions can be opposed to the passage of water, as for instance sieves and perforated dash plates which, however, must be constructed in such a manner as to check the air current as little as possible.

In the contrivance described above, which is an exemplification of an embodiment of the invention, no obstructions of any kind besides the jets of water are opposed to the air current, so that the passage for the air has the greatest possible section. A great quantity of air can come into contact with a great quantity of water at a comparatively small relative speed within a small space whereby the greatest possible cooling action is obtained.

Devices, the operation of which is dependent on the travelling speed of the vehicle, as for instance tachometers, may also be applied. These devices can be used for regulating the quantity and the distribution of the water to be cooled.

What I claim now as my invention is:

1. Apparatus for re-cooling the cooling water of steam condensing plants on vehicles, which comprises, means for dividing the water to be cooled into a plurality of jets, means for conducting a current of air through the apparatus and transversely to said jets, and means for regulating the relative quantity of water and the velocity of the cooling air to prevent the air from carrying particles of water from the apparatus.

2. Apparatus for re-cooling the cooling water of steam condensing plants on vehicles, which comprises, means for dividing the water to be cooled into a plurality of jets, means for conducting a current of air through the apparatus and transversely of said jets, and means for regulating the quantity and distribution of the water relatively to the air velocity to prevent the air from carrying particles of water from the apparatus.

3. Apparatus for re-cooling the cooling water of steam condensing plants on vehicles, which comprises, means for dividing the water to be cooled into a plurality of freely falling jets, means for conducting a current of cooling air through the apparatus transversely of said jets, and means for regulating the size of jets and their distribution relatively to the air velocity to prevent the air from carrying particles of water from the apparatus.

4. Apparatus for re-cooling the cooling water of steam condensing plants on vehicles, which comprises, means for dividing the water into a plurality of freely falling jets, means for conducting a current of cooling air longitudinally through the apparatus and transversely of said jets, means causing a subdivision of the water into two portions after said water has passed through the air current, means to return one portion of the water to the means for dividing the water into jets, and means to supply the other portion of the water to a condenser.

5. An apparatus for re-cooling the cooling water of steam condensing plants on vehicles, comprising an air conduit open at its front and rear ends, an upper reservoir for the water to be cooled having a plurality of holes in its bottom discharging into said conduit, a lower reservoir arranged to receive the water thus divided into free jets and said reservoir being sub-divided into a front and a back compartment, means for regulating the quantity of water passing across the air current, a condenser, piping connecting the condenser to the front compartment of the lower reservoir, piping connecting the back compartment of the lower reservoir to the upper reservoir, and a device in the last mentioned piping to force water to be cooled therethrough.

6. An apparatus for re-cooling the cooling water of steam condensing plants on vehicles, comprising an air conduit open at its front and rear ends, an upper reservoir for the water to be cooled having a plurality of holes in its bottom discharging into said conduit, adjustable means for regulating the quantity and the distribution of the water discharged through said holes, a lower reservoir to receive the water divided by said holes into free jets and said lower reservoir being subdivided into a front and a back compartment, a condenser comprising a reservoir for the cooling water discharged therefrom, piping connecting the back compartment of the lower reservoir to the upper reservoir, a device in the last mentioned piping adapted to force water to be cooled therethrough a piping connecting the front compartment of the lower reservoir to the condenser, a device in the latter piping adapted to force water from said front compartment into the condenser, and a further piping connecting said reservoir of the condenser to the back compartment of the lower reservoir.

In testimony that I claim the foregoing as my invention, I have signed my name.

HEINRICH ZOELLY.